United States Patent [19]
Williams

[11] 3,738,406
[45] June 12, 1973

[54] RETAINING CLIP
[75] Inventor: Malcolm Clarence Williams, Caerleon, Monmouthshire, Wales
[73] Assignee: Girling Limited, Birmingham, England
[22] Filed: Mar. 11, 1971
[21] Appl. No.: 123,260

[30] Foreign Application Priority Data
Mar. 12, 1970   Great Britain................... 11,873/70

[52] U.S. Cl. ........................ 151/41.75, 151/14 DW
[51] Int. Cl............................................. F16b 39/22
[58] Field of Search ................... 151/41.75, 30, 27, 151/15, 16; 85/32 K

[56] References Cited
UNITED STATES PATENTS

| | | | |
|---|---|---|---|
| 1,350,545 | 8/1920 | Cook | 151/14 DW |
| 2,208,779 | 7/1940 | Tinnerman | 151/41.75 |
| 2,633,886 | 4/1953 | Tinnerman | 151/41.75 |
| 3,019,409 | 1/1962 | Sarafinas | 151/41.75 |
| 3,572,751 | 3/1971 | Burr et al | 151/41.75 |
| 2,399,957 | 5/1946 | Tinnerman | 151/41.75 |
| 2,596,332 | 5/1952 | Flora et al. | 151/41.75 |
| 2,873,496 | 2/1959 | Elms | 151/41.75 |
| 3,009,499 | 11/1961 | Weihe | 151/41.75 |
| 3,110,338 | 11/1963 | Rapata | 151/41.75 |
| 3,110,372 | 11/1963 | Pierce et al | 151/41.75 |

FOREIGN PATENTS OR APPLICATIONS

| | | | |
|---|---|---|---|
| 494,073 | 5/1919 | France | 151/14 DW |
| 935,616 | 8/1963 | Great Britain | 151/41.75 |
| 994,699 | 6/1965 | Great Britain | 151/41.75 |

Primary Examiner—Marion Parsons, Jr.
Attorney—Scrivener, Parker, Scrivener & Clarke

[57] ABSTRACT

The invention concerns retaining clips capable of securing a bolt or the like and is particularly useful when used in conjunction with vehicle shoe drum brake shoes having replaceable lining components. The clip has an elongated arm carrying resilient members for locating in a slot, for example in a brake shoe web, screw engaging means to secure a bolt or screw, and a pair of opposed lugs which grip the bolt or screw and lock same against further rotation.

6 Claims, 7 Drawing Figures

RETAINING CLIP

This invention relates to retaining clips and in particular to a retaining clip capable of securing and locking a bolt.

According to the present invention there is provided a retaining strip which comprises a substantially U-shaped spring clip having a hole formed in one arm thereof and having screw engaging means in the said other arm opposite the hole, said first arm extending beyond the other arm and carrying at, or close to, its extremity a pair of opposed, upturned, dished, resilient members, the first arm further carrying a pair of opposed lugs extending in a direction away from the other arm on either side of the hole.

The screw thread in the second arm preferably comprises a square nut located in a square hole in the second arm and retained between the first arm and a pair of infolded lugs on the second arm. The hole in the first arm is preferably of greater diameter than the screw threaded hole so that a bolt can pass easily therethrough.

The dished members are preferably M-shaped.

The clip of the present invention is particularly useful when used in conjunction with the vehicle shoe drum brake linings. When using the retaining clip of the present invention in connection with removable brake linings the brake platform is not tapped to receive a screw but instead has a hole formed therein large enough to allow the screw to pass freely therethrough. The web of the brake shoe has a rectangular hole formed therein close to the platform and lying in line in an axial direction with the hole formed in the platform. The resilient M-shaped members of the clip are pushed into the rectangular hole in the web where they grippingly engage the web. The first arm is of a length such that when the M-shaped members are located within the hole in the web, the hole in the first arm and the screw thread carried by the second arm are directly underneath the hole formed in the shoe platform and the clip is therefore capable of receiving a bolt passed through the shoe platform. Each of the pair of opposed lugs is preferably inwardly inclined so as to be capable of entering the hole in the shoe platform.

The use of the retaining clip of the invention rather than a tapped hole is advantageous in that an oversized hole may be used and the screw threaded portion of the clip may be moved anywhere beneath the hole thus allowing a far greater margin for error in the location of the bolt than would be provided by a single tapped hole.

The invention will be described further, by way of example, with reference to the accompanying drawings, in which.

Figure 1:
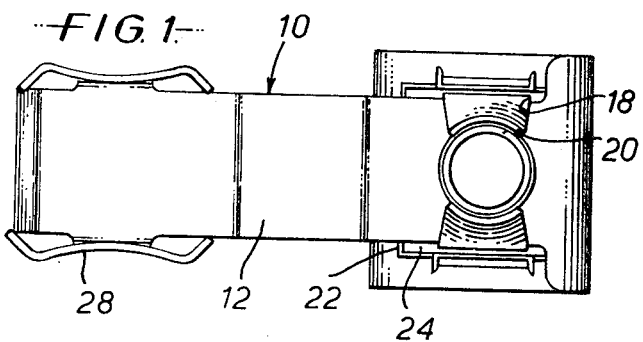
FIG. 1 is a plan view of a clip according to the invention.
Figure 2:
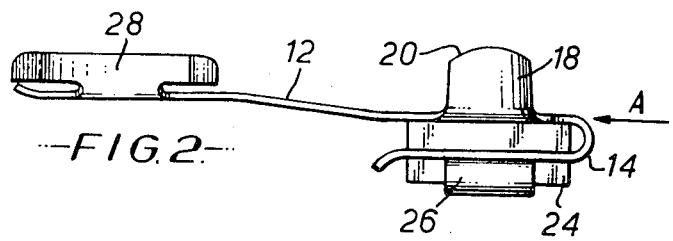
FIG. 2 is a side elevation of the clip of FIG. 1.
Figures 3, 4:
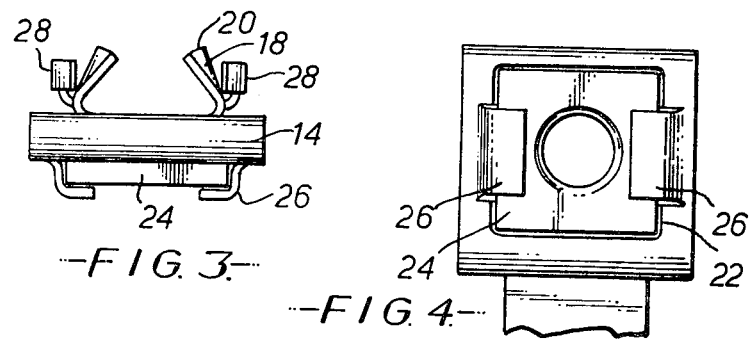
FIG. 3 is an elevation looking in direction of arrow A in FIG. 2.
FIG. 4 is a fragmentary plan view from beneath.

Referring to FIGS. 1 to 4, a clip generally designated 10 comprises a strip of metal 12 having a U-shaped bend at 14. Strip 12 has a hole 16 and on either side thereof a pair of upwardly extending lugs 18 which are deformed such that the upper edge 20 of each of the lugs 18 defines an arc of circle. The portion of the strip 12 immediately below the hole 16 has a square shaped hole 22 formed therein, loosely fitted in which is a square nut 24. The nut 24 is retained by a pair of infolded lugs 26 underneath, and by the upper part of the strip 12 on top. Although the nut 24 is securely retained by this arrangement it is able to move by small amounts with respect to the hole 16. At the end of the top arm of the strip 12 there are two opposed resilient M-shaped members 28 (most clearly shown in FIG. 1) which define between them a "potential well."

Figure 5:
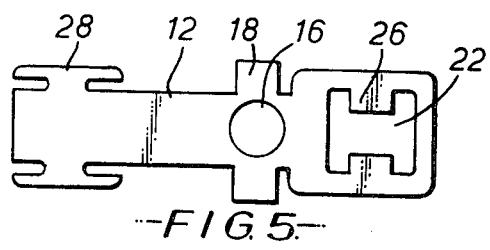
FIG. 5 is a plan view of the blank from which the clip is formed.

FIG. 5 shows the blank from which the U-shaped strip is formed. Therefore, in FIG. 5, the square hole 22, the lugs 26, the lugs 18, and the M-shaped members 28 are in their unformed state.

Figure 6:
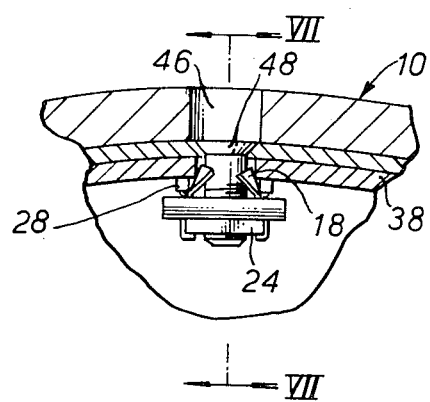
FIG. 6 is an end view, partly in section, of the clip being used in conjunction with a brake shoe and replaceable lining.
Figure 7:
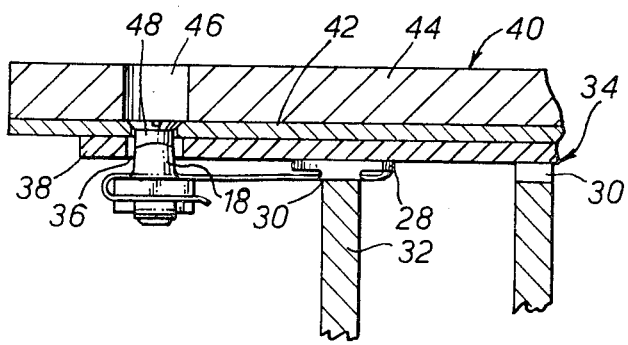
FIG. 7 is a section along the line VII—VII in FIG. 6.

In use, in connection with a brake shoe having a replaceable lining as shown in FIGS. 6 and 7, the M-shaped members 28 of the clip 10 are forced into a corresponding hole 30 in a web 32 of a brake shoe generally designated 34. When the M-shaped members 28 are correctly located in the hole 30 the clip 10 is underneath an oversized hole 36 formed in the shoe platform 38 with the lugs 18 extending into the hole 36. A brake lining component 40 comprising a backing plate 42 and a lining of friction material 44 has a hole 46 which corresponds with the hole 36 in the shoe platform 38. A bolt 48 is passed into the hole 46 in the lining component 40, through the hole 36 in the shoe platform 38, between the lugs 18 of the clip 10, through the hole 16 in the clip 10, and into the nut 24 where the threads of the bolt engage. On tightening the bolt 48 the clip is drawn upwardly into the hole 36 in the shoe platform 38 until the lugs 18 engage the shoe platform 38. As the screw 48 is turned further the lugs 18 are deformed by the platform 38 until they grip the shank of the screw 48 thus locking it.

On unscrewing the bolt 48 the clip 10 may move away from the platform 38 thus allowing the lugs 18 to open and release the bolt. Thus, the clip may be used indefinitely and provides an effective retaining and locking assembly for a bolt. Also, with the nut 24 having a certain amount of freedom of movement within its retaining enclosure the holes 46 and 38 need not line up exactly provided there is enough room for the bolt 48 to be passed therethrough. This allows manufacturing tolerances of the brake lining components to be much greater than would be the case if the hole 36 in the platform 38 where tapped to receive the bolt 48.

I claim:

1. A retaining clip which comprises: substantially U-shaped spring strip means; means defining a hole in one arm of said spring strip means; screw engaging means nonrotatably carried by the other arm of said spring strip means, directly opposite said hole; said one arm extending beyond said other arm; a pair of opposed, upturned, dished, resilient members dispersed at or close to the extremity of said one arm; and a pair of opposed lugs on said one arm located on either side of said hole and extending in a direction away from said other arm; said lugs being constructed and arranged that when the clip is used, a bolt passing through a hole in a member to which the clip is attached, and through the hole in said one arm of the clip into said screw engaging means, the said lugs as the bolt is tightened, first abut the underside of said member and then bend towards each other by engagement with the side of said hole to grip the bolt, said engagement positively preventing lateral movement of said bolt relative to said hole.

2. The retaining clip of claim 1 wherein said screw engaging means comprises a square not located in a square hole in said other arm and wherein a further pair of lugs are provided on said other arm, said further lugs being in folded to retain said nut in said square hole.

3. The retaining clip of claim 1 wherein said hole in said one arm is of greater diameter than said screw engaging means whereby a bolt may be passed through said hole to engage said screw engaging means.

4. The retaining clip of claim 1 wherein said dished members are substantially M-shaped.

5. The retaining clip of claim 1 wherein said opposed lugs are inclined toward one another.

6. The retaining clip of claim 1 wherein said opposed lugs are deformed such that their upper edges define arcs of circles.

* * * * *